Patented Jan. 30, 1923.

1,443,538

UNITED STATES PATENT OFFICE.

FRANK A. HOWARD, GEORGE H. L. KENT, AND JAMES M. JENNINGS, OF ELIZABETH, NEW JERSEY, ASSIGNORS, BY MESNE ASSIGNMENTS, TO STANDARD DEVELOPMENT COMPANY, A CORPORATION OF DELAWARE.

FOAM FOR PREVENTING EVAPORATION OF STORED LIQUIDS.

No Drawing.   Application filed March 20, 1922.   Serial No. 545,339.

*To all whom it may concern:*

Be it known that we, FRANK A. HOWARD, GEORGE H. L. KENT, and JAMES M. JENNINGS, citizens of the United States, residing at Elizabeth, in the county of Union and State of New Jersey, have invented new and useful Improvements in Foams for Preventing Evaporation of Stored Liquids, of which the following is a specification.

The present invention relates to foams and foam producing liquids and more particularly to foams intended to be floated upon the surfaces of liquids containing volatile constituents, for example, crude petroleum, gasoline, and the like, for preventing evaporation thereof, and to liquids suitable for the production of such foams. The prevention of evaporation from stored liquids of such character by means of foams permanently maintained upon the surface of the stored liquids, has been fully and completely described in a co-pending application of two of us and another, Serial No. 373,454, filed April 12, 1920.

Foams formed in accordance with the present invention are permanent or stable in character; that is, of such character that they do not break down for a very considerable length of the storage period of the material upon the surface of which they are placed. The foams may be fluent; that is, they may retain their fluent condition during their entire life, or they may be of such character as to congeal or solidify at ordinary atmospheric temperatures.

The liquid base for the preparation of a foam in accordance with the present invention may contain from 5 to 15% of water, the proportion of water being, however, preferably between 5 and 8%. From 3 to 10% of glue is incorporated in the liquid, together with from 5 to 15% of cornstarch or an equivalent starchy material. The preferred range of proportions for the glue is from 3 to 5% when associated with from 7 to 12% of cornstarch. Glucose, or an equivalent material, such as black strap molasses, and glycerine are incorporated in the liquid, the combined proportion of these added constituents being from 40 to 80%. In preparing a foam in accordance with the present invention, in which starch is incorporated, the proportion of glucose or its equivalent material should not exceed 50%. From 4 to 8% of calcium chloride is included in the mixture, and appears to increase its tensile strength at low temperatures. A suitable setting agent, such as ferrous sulfate, is incorporated to the extent of from 0.5 to 2%. The proportion of the setting agent is varied in accordance with the proportion of glue present to give the desired fluency or set to the foam. For example, with 3% of glue in the liquid, up to 0.1% of ferrous sulfate may be employed without causing the foam to gel. From 0.5 to 1.5% of a suitable foaming agent, such as the sodium salt of mineral oil sludge sulfonic acids may be incorporated, together with a suitable preservative, if desired. Any suitable preservative may be incorporated, for example, 1 to 3% of borax.

The following example illustrates a suitable foam forming liquid prepared in accordance with the present invention:

Glucose, 50%; glycerine, 24%; cornstarch, 10%; calcium chloride, 5.5%; glue, 3%; ferrous sulfate, 0.1%; sulfonic acid salt, 1%; borax, 1%; water, 5.4%.

In preparing the foam, the calcium chloride, is dissolved in the glycerine; the cornstarch is subsequently dissolved in the glycerine and the glucose admixed therewith. The ferrous sulfate is dissolved in about 0.1% of the water and the remaining constituents are dissolved in the remainder of the water. These solutions are then mixed with the glucose and glycerine containing solution and the mixture whipped and beaten to a fine-grained foam, preferably in the manner described in the co-pending application of two of us, Serial No. 373,455, filed April 12, 1920. The resulting foam is a viscous, permanently fluent foam which retains its fluency at low temperatures and nevertheless withstands relatively high temperatures without breaking down.

The foam is not substantially affected or caused to expand and contract by temperature or humidity changes. This appears to result in part from the fact that the proportion of water present exceeds only slightly that which would be absorbed by the hygroscopic calcium chloride and glycerine present.

We claim:

1. A foam for the prevention of evaporation having as its base a liquid containing from 3 to 10% of glue, from 5 to 15% of starch, glycerine, glucose, water equivalent in amount to that which would be absorbed by the hygroscopic constituents of the liquid, and a setting agent.

2. A foam for the prevention of evaporation having as its base a liquid containing from 3 to 10% of glue, from 5 to 10% of cornstarch, from 40 to 80% of glucose and glycerine, the proportion of glucose not exceeding 50%, from 4 to 8% of calcium chloride, and not more than 2% of a setting agent, together with from 5 to 15% of water.

3. A foam for the prevention of evaporation from stored liquids having as its base a liquid containing from 3 to 5% of glue, 7 to 12% of cornstarch, from 40 to 80% of glucose and glycerine, the proportion of glucose not exceeding 50%, from 4 to 8% of calcium chloride, not more than 2% of a setting agent and from 5 to 8% of water.

4. A foam for the prevention of evaporation from stored liquids having as its base a liquid containing from 3 to 5% of glue, 7 to 12% of cornstarch, from 40 to 80% of glucose and glycerine, the proportion of glucose not exceeding 50%, from 4 to 8% of calcium chloride, not more than 2% of a setting agent, from 5 to 8% of water. and 1 to 3% of borax.

5. A foam for the prevention of evaporation having as its base a liquid containing from 3 to 5% of glue, 10% of cornstarch, 50% of glucose, 24% of glycerine, 5.5% of calcium chloride, 0.1% of ferrous sulfate, 5.4% of water and a foaming agent.

6. A liquid base for foams for the prevention of evaporation containing from 3 to 10% of glue, from 5 to 15% of starch, glycerine, glucose, water equivalent in amount to that which would be absorbed by the hygroscopic constituents of the liquid, and a setting agent.

7. A liquid base for foams for the prevention of evaporation containing from 3 to 10% of glue, from 5 to 10% of cornstarch, from 40 to 80% of glucose and glycerine, the proportion of glucose not exceeding 50%, from 4 to 8% of calcium chloride, and not more than 2% of a setting agent, together with from 5 to 15% of water.

8. A liquid base for foams for the prevention of evaporation containing from 3 to 5% of glue, 7 to 12% of cornstarch, from 40 to 80% of glucose and glycerine, the proportion of glucose not exceeding 50%, from 4 to 8% of calcium chloride, not more than 2% of a setting agent and from 5 to 8% of water.

9. A liquid base for foams for the prevention of evaporation containing from 3 to 5% of glue, 7 to 12% of corn starch, from 40 to 80% of glucose and glycerine, the proportion of glucose not exceeding 50%, from 4 to 8% of calcium chloride, not more than 2% of a setting agent, from 5 to 8% of water.

10. A liquid base for foams for the prevention of evaporation containing from 3 to 5% of glue, 10% of cornstarch, 50% of glucose, 24% of glycerine, 5.5% of calcium chloride, 0.1% of ferrous sulfate, 5.4% of water and a foaming agent.

FRANK A. HOWARD.
GEORGE H. L. KENT.
JAMES M. JENNINGS.